(12) United States Patent
Heinonen et al.

(10) Patent No.: US 9,845,161 B2
(45) Date of Patent: Dec. 19, 2017

(54) SYSTEM AND METHOD FOR CALCULATING WEIGHT DISTRIBUTION OF DRONE

(71) Applicant: Sharper Shape Oy, Espoo (FI)

(72) Inventors: Tero Heinonen, Jarvenpaa (FI); Atte Korhonen, Espoo (FI)

(73) Assignee: Sharper Shape Oy, Espoo (FI)

( * ) Notice: Subject to any disclaimer, the term of this patent is extended or adjusted under 35 U.S.C. 154(b) by 0 days.

(21) Appl. No.: 15/136,315

(22) Filed: Apr. 22, 2016

(65) Prior Publication Data

US 2017/0305570 A1 Oct. 26, 2017

(51) Int. Cl.
*B64C 39/02* (2006.01)
*B64D 43/00* (2006.01)

(52) U.S. Cl.
CPC ............ *B64D 43/00* (2013.01); *B64C 39/024* (2013.01); *B64C 2201/126* (2013.01); *B64C 2201/141* (2013.01); *B64C 2201/146* (2013.01)

(58) Field of Classification Search
CPC . B64D 43/00; B64C 39/024; B64C 2201/126; B64C 2201/141; B64C 2201/146

USPC ........................................................ 701/124
See application file for complete search history.

(56) References Cited

U.S. PATENT DOCUMENTS 8,157,205 B2 * 4/2012 McWhirk ................. B64B 1/02
212/274
9,139,283 B1 * 9/2015 Campbell ................. B64C 1/22

* cited by examiner

*Primary Examiner* — McDieunel Marc
(74) *Attorney, Agent, or Firm* — Ziegler IP Law Group, LLC

(57) ABSTRACT

A system having a drone and a payload frame connected to the drone, wherein the payload frame includes a mechanism for attaching at least one payload module to the payload frame and electrically coupling the at least one payload module to the payload frame. The electrical coupling includes a communication interface for communicating with a controller of the drone, and is configured to communicate a relative location of the at least one payload module in the payload frame, a weight of the at least one payload module and a volume of the at least one payload module. The controller of the drone is configured to calculate a weight distribution within the payload frame, based on the relative location of the at least one payload module, the weight of the at least one payload module and the volume of the at least one payload volume.

14 Claims, 2 Drawing Sheets

SYSTEM AND METHOD FOR CALCULATING WEIGHT DISTRIBUTION OF DRONE

TECHNICAL FIELD

The present disclosure relates generally to an unmanned aerial vehicle or a drone; and more specifically, to a system and a method for calculating a weight distribution of a payload associated with such unmanned aerial vehicle or drone to generate flight parameters thereof.

BACKGROUND

Drones or unmanned aerial vehicles (UAVs) may be used for surveillance, inspections, surveys, disaster relief operations, and aerial imaging. Typically, flight parameters of the drones are remotely controlled by an operator from a ground station, alternatively the drone may be configured to fly autonomously (controlled by an on-board computer based on some pre-programmed instructions).

Each drone includes a payload having a payload frame and at least one payload module, such as cameras, cargo, and communication units, associated with the payload frame. Generally, the payload may have different physical properties, such as weight, volume and moment of inertia, based on the type of payload module associated therewith. Also, different payload may include different physical properties. Further, for many operations the payload configuration may need to be frequently changed between the flights for example by selecting a specific combination of sensors for each flights. Therefore, different construction and configuration of such payloads can substantially influence flight parameters when used with a same drone. Further, if the flight parameters are not defined or configured properly, the operation of the drone may become difficult either when manually operated or programmed to fly in auto-pilot mode. Further, a discrepancy of the flight parameters and the actual payload characteristics may cause override or underdrive response in automated flight control causing for example oscillations potentially destroying and crashing the drone or a failure to change the flight trajectory. These problems pose the risk of aviation accident, ground or air collisions and losing the control of the aircraft. Moreover, the payload modules may include functional components of duplicate nature, i.e. same functional components present in more than one payload module. For example, remote communication means may be present in more than one payload module; otherwise such communication means may be present in the drone itself. This duplicate nature of the functional components may increase an overall weight of the drone, which may further influence the flight parameters during configuration thereof.

Therefore, in light of the foregoing discussion, there exists a need to overcome the aforementioned drawbacks associated with configuration of the flight parameters of the drones.

SUMMARY

The present disclosure seeks to provide a system, having a drone and a payload frame connected to the drone, for calculating a weight distribution of the system to generate flight parameters thereof.

The present disclosure further seeks to provide a method for calculating a weight distribution of a system having a drone and a payload frame connected to the drone. The present disclosure thus seeks to provide a method and system for optimising flight parameters of a drone, based on the weight distribution of the payload it carries. The present description also seeks to provide a system and method that at least partially overcome the drawbacks of the previously known drones.

In one aspect, an embodiment of the present disclosure provides a system comprising a drone and a payload frame connected to the drone, wherein the payload frame comprises means for attaching at least one payload module to the payload frame and means for electrically coupling the at least one payload module to the payload frame, each means for electrically coupling comprises a communication interface for communicating with a controller of the drone, the communication interface is configured to communicate a relative location of the at least one payload module in the payload frame, a weight of the at least one payload module and a volume of the at least one payload module, and the controller of the drone is configured to calculate a weight distribution within the payload frame, based on the relative location of the at least one payload module, the weight of the at least one payload module and the volume of the at least one payload module.

In another aspect, an embodiment of the present disclosure provides a method for calculating a weight distribution of a system comprising a drone and a payload frame connected to the drone, wherein the payload frame communicates, via a communication interface of a means for electrically coupling at least one payload module to the payload frame, with a controller of the drone, a relative location of the at least one payload module in the payload frame, a weight of the at least one payload module and a volume of the at least one payload module, and the controller calculates a weight distribution within the payload frame, based on the relative location of the at least one payload module, the weight of the at least one payload module and the volume of the at least one payload module.

Embodiments of the present disclosure substantially eliminate or at least partially address the aforementioned problems in the prior art, and enables in managing weight distribution of the drone for efficiently configuring flight parameters of the drone.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
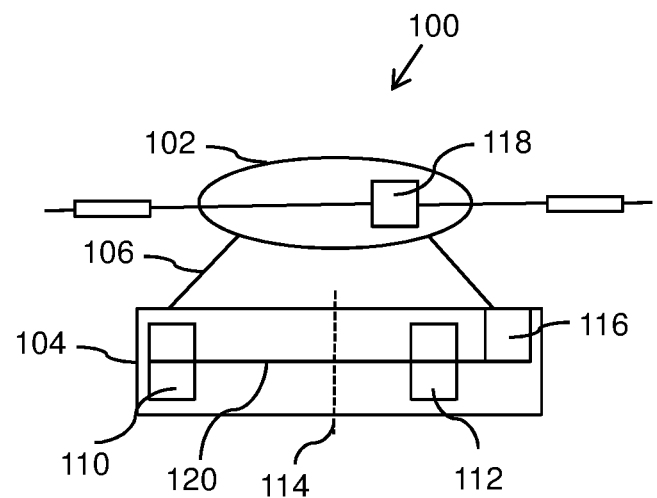
FIG. 1 is a schematic illustration of a system comprising a drone and a payload frame, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. Features and embodiments disclosed in connection with the method or system also apply mutatis mutandis to the system and method, respectively.

The present disclosure provides a system comprising a drone and a payload frame connected to the drone. In an embodiment, the drone and the payload frame are connected to each other using a coupling means. For example, the coupling means may be mere mechanical or electro-mechanical in nature. The system of the present disclosure may be used for various functions, such as surveillance, disaster relief operations, aerial imaging, product delivery and the like.

According to an embodiment, the drone comprises various mechanical, electronic and electro-mechanical components, such as motors, propellers, battery, communication means, sensors, and frame.

The drone also includes a controller for generating and controlling flight parameters of the system. For example, the flight parameters may include but not limited to speed, altitude, turning speed of the system.

The payload frame may also include at least one payload module. The payload module may be an integral part of the payload frame. Otherwise, the payload module may be a separate part adapted to be operatively coupled to the payload frame.

In an embodiment, the payload modules may include but not be limited to a camera, a light detection and ranging (LiDAR) unit, a wireless communication unit, and a global positioning system. The payload module may define the functional aspect of the system. For example, a payload module such as a camera may enable the drone to perform function of surveillance or capturing images. Similarly, a payload module such as a LiDAR unit may enable the system to survey a portion of land, i.e. to generate precise, three-dimensional surface characteristics of such portion of the land. Further, the wireless communication unit may enable the system to remotely communicate, for example with a ground station.

In another embodiment, the payload module may include a cargo, such as medical supply, food supply or any other goods that can be suitably carried and delivered by the drone. In such instance, the primary function of the system is to deliver such cargo from one place to another, for example to support disaster relief operations.

In an embodiment, the payload frame may be a receptacle (or container) configured to accommodate or support the at least one payload module. For example, the payload frame may be configured to have (or divided into) a plurality of segments or compartments for supporting or accommodating the payload modules. Otherwise, the payload frame may include a single hollow space instead of plurality of segments.

The payload frame comprises means for attaching the at least one payload module to the payload frame. The term "means for attaching" used herein refers to a mechanical attachment means that enables mechanical attachment between the payload module and the payload frame. For example, such means for attaching may include snap fit arrangement, slide fit arrangement, press fit arrangement, nuts, hooks and the like.

The payload frame also comprises means for electrically coupling the at least one payload module to the payload frame. The term "means for electrically coupling" used herein includes an electrical interface, which may include electrical wires, electrical ports or slots, electronic elements, electronic circuit and the like, for establishing electrical coupling between the at least one payload module and the payload frame.

The each means for electrically coupling comprises a communication interface for communicating with a controller of the drone. The term "communication interface" used herein typically includes an electronic circuit, usually designed to a specific standard that enables telecommunication between the at least one payload module and the controller of the drone. In an example, the communication interface may be a wired communication interface or a wireless-less communication interface, which may include but not be limited to Bluetooth, ZigBee and NFC (near field communication).

In an embodiment, the payload frame may be a construction similar to a rectangular computer rack, having a dimension ranging from 5 inches to 50 inches. For example, the payload frame may be a 19 inch rack having a plurality of segments for receiving the payload modules therein. Otherwise, the payload frame may be configured to have any suitable shape, such as oval or spherical or cylindrical with or without segment, but essentially with both means for mechanical and electrical coupling for the payload modules.

The communication interface (comprised in the means for electrically coupling) is configured to communicate a relative location of the at least one payload module in the payload frame, a weight of the payload module and a volume of the payload module.

According to an embodiment, the relative location of the at least one payload module in the payload frame mean where exactly the payload modules are positioned with respect to the entire payload frame, for example, which payload module is arranged in which segment of the payload frame. In an embodiment, the relative location of the payload module in the payload frame is defined with respect to the means for electrically coupling to which the at least one payload module is electrically coupled. For example, when any payload module is electrically coupled to a segment, the relative location of such payload module may be determined with the established electrical coupling between such payload module and the corresponding electrical port of such segment.

In one embodiment, the means for electrically coupling of the payload frame also comprises a microcontroller for determining the relative locations of the payload modules in the payload frame. The microcontroller is capable of determining when a payload module is electrically coupled to an electrical port of any specific segment or any specific portion of the payload frame, and based on the location of that specific segment with respect to the entire payload frame a relative location of the payload module with respect to the payload frame is determined by the microcontroller. In another embodiment, the microcontroller is also capable of determining which type of the payload module is coupled to the payload frame.

In an embodiment, the payload frame may be configured to have segments of same shape and size, and with uniform means for electrically coupling arranged thereon. For example, the electrical ports of the each segment of the payload frame may be equidistantly placed along the payload frame. In an example, the electrical ports may be spaced apart from each other by few inches, such as by 5 inches. Therefore, if a payload frame includes 5 segments, and two payload modules are positioned at the extreme segments, then the two payload modules are spaced apart by 12.5 inches with respect to a midpoint of the payload frame. Similarly, if only one payload module is positioned at a central segment of the payload frame, then the payload module is at a distance of 0 inches from the midpoint of the payload frame. Further, the relative location of the payload modules may be measured either with respect to the midpoint of the payload frame or any specific portion, such as a corner or an edge, of the payload frame.

As mentioned above, the communication interface is also configured to communicate the weight of the payload module and the volume of the payload module. In an embodiment, sensors (capable of measuring weight and volume of an object) may be arranged in the payload frame. Therefore, when the payload modules are operatively coupled to the payload frame such sensors may measure the weight and the volume of the payload modules. In another embodiment, the payload modules may include such sensors for measuring the weight and the volume thereof, and communicate the same through the communication interface.

In one embodiment, the volume of a payload module may be associated with a size of the segments of the payload frame. For example, the volume of the payload module may be expressed in terms of rack units (U or RU), which is based on a usable space inside the computer rack (i.e. the payload frame). For example, the payload modules may include volume of 1 U, 1.5 U and 2 U. Further, the weight of the payload modules may be measured (or expressed) in terms of pounds or kilogram.

In an embodiment, at least one of the payload modules is configured to communicate its weight and volume to the controller via the communication interface, i.e. the communication is direct from the payload module to the controller. For example, data associated with the relative location, the weight and the volume of the payload modules may be initially received by the microcontroller of the payload frame. Thereafter, the microcontroller of the payload frame may communicate with the controller of the drone with the help of a communication interface. In an example, the microcontroller of the payload frame and the controller of the drone may include a wired communication interface therebetween, otherwise a wireless-less communication interface, which may include but not be limited to Bluetooth, ZigBee and NFC (near field communication).

In another embodiment, at least one of the payload modules is configured to communicate a further physical property of the at least one payload module. For example, the further physical property of the at least one payload module is selected from a group comprising weight distribution, centre of mass, dimensions, moment of inertia and angular mass. Specifically, the further physical properties associated with each payload module may be communicated to the controller of the drone with the help of the microcontroller of the payload frame.

The controller of the drone is configured to receive payload module information (i.e. the relative location of the at least one payload module in the payload frame, the weight and the volume) via the communication interface. Thereafter, the controller of the drone is configured to calculate a weight distribution within the payload frame, based on the relative location of the at least one payload module, the weight of the payload module and the volume of the payload module. It is to be understood that, the controller of the drone may also be configured to receive the payload module information, such as the further physical property (the weight distribution, the centre of mass, the dimensions and the angular mass) of the payload modules for calculation of the weight distribution within the payload frame. The calculated weight distribution within the payload frame enables in determining what all payload modules (specifically, of what size and weight) are accommodated at what location in the payload frame.

In another embodiment, the microcontroller of the payload frame may be configured to calculate the weight distribution within the payload frame (based on the relative location, the weight, the volume and the further physical property of the payload module). Thereafter, the microcontroller is configured to communicate the calculated weight distribution to the controller of the drone.

The controller of the drone may be configured to generate flight parameters of the system, based on at least the weight distribution within the payload frame. The flight parameters may include but not be limited to speed, altitude and turning speed, of the system. In an example, based on the weight distribution within the payload frame, a rotational speed of propellers (or the motors coupled thereto) may be adjusted by the controller to make the flight of the system balanced and steady. Similarly, based on the weight distribution within the payload frame, the altitude and the turning speed of the system may be adjusted.

In one embodiment, the at least one payload module associated with the payload frame further comprise a positioning means for determining a location (i.e. geographical coordinates, latitude & longitude coordinates) of the system, for example when the system is following any specific aerial route. Further, the payload module may comprise a wireless communication means. These communication means may be used for example for wirelessly communicating location data of the system to a ground station. In another embodiment, the positioning means and the wireless communication means may be present in the drone rather than in the payload module. In yet another embodiment, the controller of the drone communicates with the at least one payload module for receiving position information and for communicating with a ground station.

In one embodiment, a weight, a volume and a further physical property of the payload frame may be known to the controller of the drone, otherwise the payload frame may be configured to communicate such information to the controller of the drone for the generation of the flight parameters of the system.

The present disclosure provides a system and a method for calculating weight distribution of a system having a drone and a payload frame. The system and the method enables in efficiently configuring flight parameters of the drone. Specifically, the system and the method takes into account a weight distribution within a payload frame, based on relative location of payload modules associated with the payload frame. This enables in efficiently configuring the flight parameters, which facilitates steady flight of the drone either when manually operated or configured to fly autonomously. Further, the preset disclosure enables in removing duplicate functional components, such as communication and navigation elements, present in the system. This enables in reducing an overall weight of the system, which further influences the flight parameters during configuration thereof. In the above, when it is mentioned that at least one payload module or other part of the system can be configured to act in a particular way, it is to be understood that several or all of such parts are configured accordingly. It may also be that some payload is integral to the frame and hence do not need to communicate with the controller, as their location and other characteristics do not vary but remain the same as entered into the controller when setting it up.

DETAILED DESCRIPTION OF THE DRAWINGS

Referring to FIG. 1, illustrated is a schematic illustration of a system 100 comprising a drone 102 and a payload frame 104, in accordance with an embodiment of the present disclosure. The payload frame 104 is connected to the drone 102 using as coupling means 106. Further, the payload frame 104 is shown arranged with at least one payload modules, such as payload modules 110, 112. The payload modules 110, 112 are positioned relative to a middle portion 114 of the payload frame 104. The payload frame 104 also comprises a microcontroller 116. The microcontroller 116 is configured to communicate with a controller 118 of the drone 102.

The payload frame 104 also includes means for attaching (for physical attachment, not shown) the payload modules 110, 112 with the payload frame 104. The payload frame 104 further includes means for electrically coupling 120 (shown and explained in greater detail in FIG. 2) for the payload modules 110, 112. The each means for electrically coupling 120 includes a communication interface for communicating with the controller 118 of the drone 102. The communication interface is configured to communicate a relative location of the payload modules 110, 112 in the payload frame 104, a weight and a volume of the payload modules 110, 112 to the controller 118. In this embodiment, the payload modules 110, 112 are also configured to communicate a further physical property, such as weight distribution, centre of mass, dimensions and angular mass thereof to the controller 118.

Figure 2:
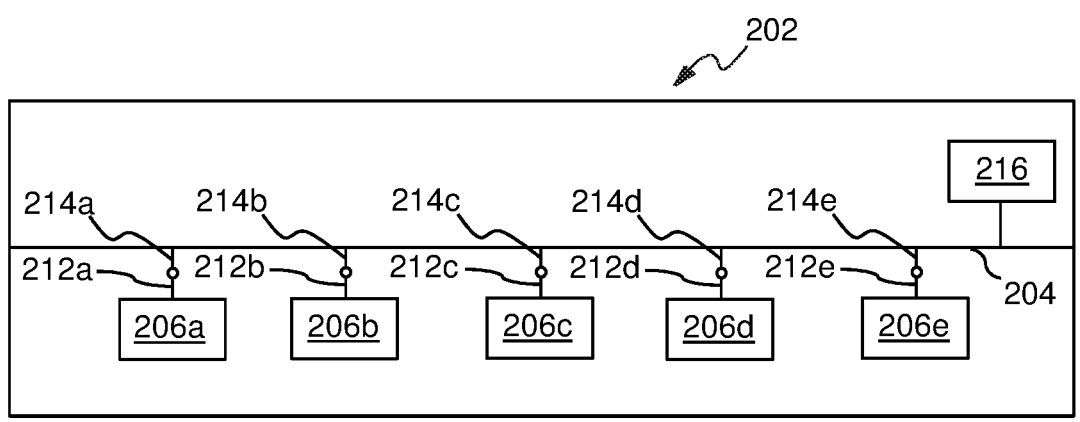
FIG. 2 is a schematic illustration of a payload frame depicting means for electrical coupling arranged thereon, in accordance with an embodiment of the present disclosure.

Referring to FIG. 2, illustrated is a schematic illustration of a payload frame 202 depicting means for electrical coupling arranged thereon, in accordance with an embodiment of the present disclosure. As shown, the payload frame 202 includes means for electrically coupling 204 at least one payload module, such as payload modules 206a-206e, to the payload frame 202. The means for electrically coupling 204 includes electrical connections 212a-212e (such as electrical ports or connectors) configured at uniform distance, and communication interfaces 214a-214e. The communication interfaces 214a-214e are configured to communicate relative locations of the payload modules 206a-206e in the payload frame 202, weight, volume and further physical properties of the payload modules 206a-206e to the controller 118 of the drone 102 (shown in FIG. 1).

As shown, the payload frame 202 also includes a microcontroller 216 configured to receive and/or determine data associated with the relative location, the weight, the volume and the further physical properties of the payload modules 206a-206e (for example with the help of sensors, arranged on the payload frame 202, not shown). Further, the microcontroller 216 is communicably coupled to the controller 118 of the drone 102 to transmit such data associated with the payload modules 206a-206e. Therefore, based on the received data the controller 118 is configured to calculate weight distribution within the payload frame 202, and further generate flight parameters of the system 100 (shown in FIG. 1) based on at least such calculated weight distribution within the payload frame 202.

Figure 3:
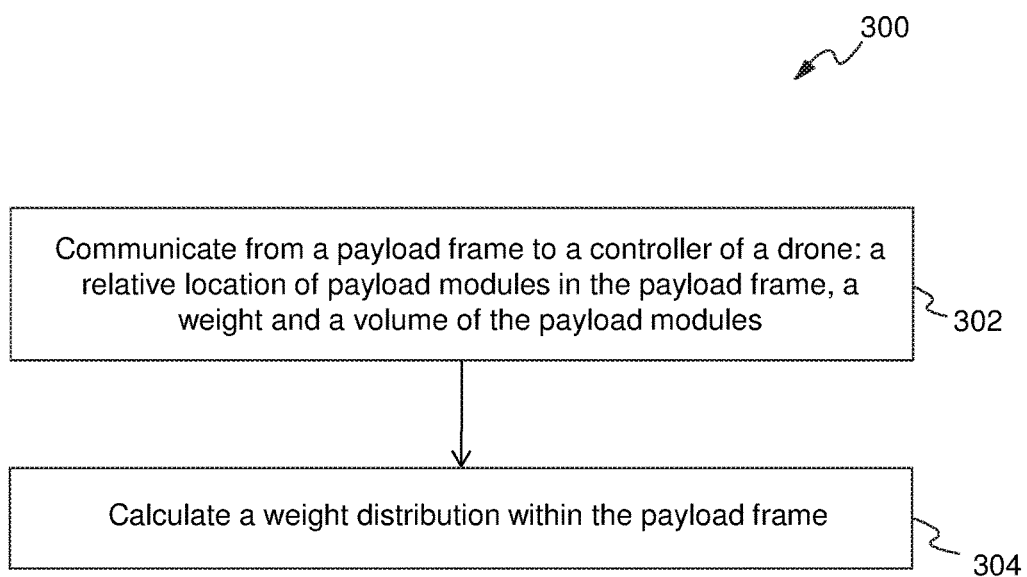
FIG. 3 is an illustration of steps of a method for calculating a weight distribution of a system having a drone and a payload frame, in accordance with an embodiment of the present disclosure.

Referring now to FIG. 3, illustrated are steps of a method 300 for controlling a weight distribution of a system comprising a drone and a payload frame. Specifically, those skilled in the art would recognize that the steps of the method 300 are associated with the system (as explained in conjunction with FIGS. 1-2), i.e. to generate flight parameters of the system based on a weight distribution thereof.

At step 302, the payload frame communicates, via a communication interface of a means for electrically coupling at least one payload module to the payload frame, with a controller of the drone, a relative location of the at least one payload module in the payload frame, a weight of the at least one payload module and a volume of the at least one payload module.

At step 304, the controller calculates a weight distribution within the payload frame, based on the relative location of the at least one payload module, the weight of the at least one payload module and the volume of the at least one payload module.

Further, the steps 302 and 304 are only illustrative and other alternatives can also be provided where one or more steps are added, one or more steps are removed, or one or more steps are provided in a different sequence without departing from the scope of the claims herein. For example, in the method 300, the at least one payload module communicates its weight and volume to the controller via the communication interface. Further, in the method 300, the controller further generates flight parameters of the system, based on at least the weight distribution within the payload frame.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising:
a drone and a payload frame connected to the drone
at least one payload module attached to the payload frame, the payload frame being electrically coupled to the at least one payload module,
a communication interface coupled between the payload frame and the at least one payload module, the communication interface configured to enable the payload frame and the at least one payload module to communicate with a controller of the drone, and wherein:
the communication interface is configured to communicate a relative location of the at least one payload module in the payload frame, a weight of the at least one payload module and a volume of the at least one payload module to the controller of the drone, and
the controller of the drone is configured to calculate a weight distribution within the payload frame based on the relative location of the at least one payload module, the weight of the at least one payload module and the volume of the at least one payload module.

2. A system according to claim 1, wherein an electrical port is used to electrically coupled the at least one payload module to the payload frame, and wherein the relative location of the at least one payload module in the payload frame is defined with respect to the electrical port to which the at least one payload module is electrically coupled.

3. The system according to claim 2, wherein the payload frame comprises a plurality of segments and an electrical port is associated with a respective one of the plurality of segments and the relative location of the at least one payload module is determined by a location of the respective one of the plurality of segments with which the electrical port that electrically couples the at least one payload module to the payload frame is associated.

4. A system according to claim 1, wherein the at least one payload module is configured to communicate the weight and volume of the least one payload module to the controller via the communication interface.

5. A system according to claim 1, wherein the at least one payload module is further configured to communicate a further physical property of the at least one payload module.

6. A system according to claim 5, wherein the further physical property of the at least one payload module is selected from a group comprising weight distribution, centre of mass, dimensions and angular mass.

7. A system according to claim 1, wherein the controller is further configured to generate flight parameters of the system, based on at least the calculated weight distribution within the payload frame.

8. The system according to claim 7, wherein the controller is configured to adjust a current set of flight parameters of the system to the generated flight parameters.

9. A system according to claim 1, wherein the at least one payload module comprises a positioning means and a wireless communication means, and wherein the controller of the drone communicates with said at least one payload module for receiving position information and for communicating with a ground station.

10. A method for calculating a weight distribution of a system comprising a drone and a payload frame connected to the drone, wherein the method includes:
the payload frame communicating, via a communication interface electrically coupling at least one payload module to the payload frame, with a controller of the drone, a relative location of the at least one payload module in the payload frame, a weight of the at least one payload module and a volume of the at least one payload module, and
wherein the controller calculates a weight distribution within the payload frame, based on the relative location of the at least one payload module, the weight of the at least one payload module and the volume of the at least one payload module.

11. A method according to claim 10, wherein the method includes the at least one payload module communicating the weight and volume of the at least one payload module to the controller via the communication interface.

12. A method according to claim 10, wherein the controller further generates flight parameters of the system, based on at least the weight distribution within the payload frame.

13. The method according to claim 12, wherein the method includes the controller adjusting a current set of flight parameters of the system to the generated flight parameters.

14. The method according to claim 10, wherein the payload frame comprises a plurality of segments and an electrical port is associated with a respective one of the plurality of segments and wherein the method includes determining the relative location of the at least one payload module by determining a location of the respective one of the plurality of segments with which the electrical port that electrically couples the at least one payload module to the payload frame is associated.

* * * * *